United States Patent [19]

Vaillancourt

[11] Patent Number: 4,525,374

[45] Date of Patent: Jun. 25, 1985

[54] TREATING HYDROPHOBIC FILTERS TO RENDER THEM HYDROPHILIC

[75] Inventor: Vincent L. Vaillancourt, Livingston, N.J.

[73] Assignee: Manresa, Inc., Hillsdale, N.J.

[21] Appl. No.: 583,629

[22] Filed: Feb. 27, 1984

[51] Int. Cl.$^3$ ............................ A01N 1/02; B05D 5/00
[52] U.S. Cl. ...................................... 427/2; 210/500.2; 427/244; 428/315.7; 428/341; 604/126; 604/190; 604/405
[58] Field of Search ............................ 427/2, 244–246; 428/315.7, 319.7, 341, 518, 520; 429/144, 145, 247–250; 210/500.2; 128/760–769; 604/126, 190, 405

[56] References Cited

U.S. PATENT DOCUMENTS

| | | | |
|---|---|---|---|
| 3,853,601 | 12/1974 | Taskier | 429/145 X |
| 4,346,142 | 8/1982 | Lazear | 427/44 X |
| 4,359,510 | 11/1982 | Taskier | 429/144 |
| 4,413,074 | 11/1983 | Wrasidle et al. | 427/244 X |

*Primary Examiner*—Michael R. Lusignan
*Attorney, Agent, or Firm*—Ralph R. Roberts

[57] ABSTRACT

A method is described for coating a hydrophobic filter membrane so as to render said membrane hydrophilic. This method is particularly for treating polypropylene or polytetrafluoroethylene in which the filter membrane is contemplated to have a pore size not larger than two (2) microns. The treating solution has Triethanolamine Dodecylbenzene Sulfonate (LAS) as the active ingredient. This treatment may use heated air (125° to 200° F.) as a drying assist which renders the membrane to have a substantially instantaneous "wet-out".

6 Claims, No Drawings

TREATING HYDROPHOBIC FILTERS TO RENDER THEM HYDROPHILIC

BACKGROUND OF THE INVENTION

1. Field of the Invention

This invention is directed to rendering hydrophobic filters hydrophilic. This is accomplished by coating the substrate (membrane pores) with a chemical. It has been found the chemical family of this invention will render all commercially known hydrophobic membranes hydrophilic. This chemical treatment is especially suited for polypropylene (PP) and fluorinated ethylene type polymers (fetp) which may include polytetrafluoroethylene (PTFE). It is to be especially noted that this coating renders the treated filter useful for medical device purposes and the such treated material non-toxic.

2. Description of the Prior Art

Many patents and papers (publications) have been directed toward and to making a hydrophobic filter to become hydrophilic. Among these patents, the references and citations are U.S. Pat. No. 3,853,601 as issued to TASKIER on Dec. 10, 1974; U.S. Pat. No. 4,359,510 also to TASKIER as issued Nov. 16, 1982 and U.S. Pat. No. 4,346,142 as issued to LAZEAR on Aug. 24, 1982. New developments in filter technology and in particular in small particle filters usually produces hydrophobic filters whereas it is desired that these filters are required to pass fluids.

This invention is particularly directed to polypropylene (PP) and polytetrafluoroethylene (PTFE) or membranes of like materials which are by nature hydrophobic (water repelling). Such a membrane material may be made hydrophilic (water loving) by wetting the surface of this membrane by using a liquid whose surface tension is less than the critical surface tension of the polymer. This is about thirty dynes per cm. for PP, PTFE and like type of polymers. Such treating materials include low molecular weight alcohols and solvents such as Freon (chlorinated hydrocarbon) whose surface tensions are less than the critical surface tension of PP; PTFE and like type of polymers.

Another method or process of making hydrophobic material especially polypropylene hydrophilic is subjecting the PP membrane material to a corona discharge treatment. Unfortunately, this process or method affects only the outer visible surface of the material and makes such surfaces hydrophilic. The resulting product is only useful for filters having large pore sizes (that in which the material's membrane is greater than three to five microns in size). Smaller pore size membranes for which corona discharge has been tried have produced unsatisfactory results and the membrane or filter so treated is only partially hydrophilic.

Various and many surfactant-type chemicals have been tried and have been successful to some degree with polypropylene (PP). Much poorer results have been obtained using PTFE. One problem has been unevenness of coating in which the sufactant either migrates or accumulates in one section of the membrane material making that area hydrophilic while other areas continue to exhibit hydrophilic properties and pass gases but not liquids. The resulting coated membrane may or may not pass some quantities of liquids, but the desired flow is not achieved in comparison to that obtained if a total membrane "wet out" were accomplished. More importantly, the membrane will pass gases, which is highly undesirable in many applications. Again, results when PTFE materials have been tried have been most discouraging with almost no success.

Another problem found in using known surfactant chemicals is downstream foaming which may occur as a fluid initially enters and passes through the micropores of the hydrophilic membrane and flushes out the applied coating. In use the practitioner may find this foaming undesirable because of appearance and/or as an indicator that a high concentration of the chemical is present and this chemical may be harmful. This can be avoided by adding anti-foam agents. However, this increases the total concentration of additives and generally causes increased potential toxicity problems.

Among other problems with known surfactants chemicals is that caused by the used surfactant having a "cloud point". This is the temperature at which the solution containing the surfactant becomes cloudy. This appearance change seems to occur due to the formation of a sol (gels) within the solution. This "cloud point" is defined as a definite temperature at which this phenomenon takes place for a given concentration. In reduction to practice or use this appears to actually occur over a wide temperature range. In other words, gels are present in the solution over a wide temperature range. Their concentration increases until they become highly visible as a haze in the solution at the "cloud point" temperature. This property is highly undesirable, especially when pharmaceutical type products are being prepared or filtered since the gels may form and remain in the solution on the downstream portion of the filter membrane, that is after passing through the filter. The commercially known and used chemical surfactants used for medical device filters such as Triton, Klucel and Pluronics all exhibit this phenomenon. Although the exact effect of these gels on the human circulatory system is not fully understood they are undesirable and many firms in the medical supply field are presently concerned about using products where these chemical surfactants are present.

Corona discharge treatment appears to only render the outer surface of the polypropylene filter membrane hydrophilic and unless large pore size membranes (greater than three microns) are used the corona effect does not extend to the inner filter surfaces. In addition, when corona discharge has taken effect the change of surface properties allows drug binding to occur. Similar results have been noted with PTFE membranes.

It is therefore highly desirable to maintain the existing (inert characteristics) surface properties of hydrophobic membrane filters and yet render these filters hydrophilic such that they can be used for fluid filtration particularly for pharmaceutical processes.

Another property, especially exhibited by polypropylene membranes is their ability to retain significant quantities of endotoxins. This property is highly desirable since bacteria are often killed on the surface of the membrane due to the introduction of antibiotic drugs during use. Decomposition of the bacteria present begins almost immediately in the presence of the drug and quantities of endotoxin begin to form. Under these conditions the replacement of this system is essential (usually within hours) since there is a danger that these substances will flow downstream from the filter and enter the bloodstream of the patient and cause severe toxicity problems.

A problem associated with existing hydrophilic membrane used in pharmaceutical applications is that of drug binding. A quantity of drug is held on the filter. As a result the patient receives less than the quantity of drug the physician has prescribed and may cause patient complications. Hydrophilic membranes once "wet out" exhibit little or no tendency to bind drugs. As a result, it is generally desired to maintain the inert properties of a hydrophobic membrane surface that does not chemically or physically alter the surface characteristic of the membrane while concurrently making it behave as a hydrophilic filter.

A number of surfactants including those above noted may "wet out" some of the hydrophobic membrane. Heretofore the commercially known and used chemical systems are either toxic; form gels (cloud point), require large quantities to "wet out", or alter the surface of the hydrophobic membrane such that drug binding and/or ability of the membrane to retain endotoxins is lost. For the above reasons it is very desirable to disclose a chemical system that will "wet out" hydrophobic membranes without altering their surface properties. The following disclosure employs LAS (linear alkylbenzene sulfonate) as a chemical since it is non-toxic; has no cloud point; requires small quantity for treatment, and produces no change in the hydrophobic membranes surface properties and renders polypropylene and PTFE material systems hydrophilic.

SUMMARY OF THE INVENTION

This invention may be summarized, at least in part, with reference to its object.

It is an object of this invention to provide, and it does provide, a chemical system usable with hydrophobic filters having a porosity of less than two microns. This chemical system is non-toxic and does not change the filter's properties other than rendering the filter as hydrophilic over the entire surfaces. It should be noted that after "wet out" and use should the filter be dried the surface properties are identical to those exhibited prior to coating, the surface is hydrophobic, inert and identical to the non-coated membrane material.

In brief, this chemical system uses LAS in small quantities and may be as small as one-eighth (0.125) to one-third (0.33) percent in a solution composed of a fifty-fifty (50/50) mixture of isopropy alcohol and water. Triethanolamine Dodecylbenzene Sulfonate (designated LAS) is the Linear Alkylbenzene Sulfonate material used throughout this application. This chemical solution, after application to the filter (dipping, syringe injection, etc.) may be air dried or may be heated at about one hundred fifty degrees Fahrenheit for two hours. When air-drying time is utilized, the "wet-out" time (that is, the time for the filter to absorb fluid and begin to filter same) is five to ten seconds. When the membrane is dried under moderate temperatures of one hundred twenty-five to two hundred degrees Fahrenheit, the dried filter will "wet out" instantaneously (less than one second).

The present invention is directed to a chemical system in which a linear alkylbenzene sulfonate (LAS) may be used as an agent to render hydrophobic membranes hydrophilic. When mixed to form solutions as per the following example, these solutions do not produce "cloud points" regardless of the solution concentration. Such solutions are non-toxic and, most important, LAS solutions do not produce a gel. The solution or solutions can be used in very small quantities and concentrations may be as low as one-eighth to one-third of a percent (0.125 to 0.33%). Using an LAS solution, there is very little, if any, foaming and, more importantly, the filter material exhibits an even coating throughout the interstices of the membrane pores even for filters in the sub-micron range (for example, only 0.01 microns), the smallest membrane evaluated. No migration has been detected. The coating may be applied using a mixture of isopropyl alcohol and water as the diluent. Most important, this mixture does not require a "pre-wet" of the membrane being treated, saving a step in the coating process.

A preferred manufacturing coating procedure includes: making a coating solution prepared by mixing in a glass or plastic container 700 cc. (seven hundred cubic centimeters) of isopropyl alcohol with 300 cc. (three hundred cubic centimeters) of deionized water. After mixing, to this solution are added 15 cc. (fifteen cubic centimeters) of Witconate 60 L, commercially available from Witco Chemical Corp., Organics Division, 3230 Brookfield Street, Houston, Tex. 77045. This is a commercially available form of triethanolamine dodecylbenzenesulfonate (LAS). This mixture is stirred gently for one to two minutes to insure uniform dispersion of the chemical (LAS) in the alcohol-water to form a uniform coating solution.

The PTFE strip member is dipped or immersed in this solutiob for two to five seconds, followed by drying in an oven at 120° to 140° F. (one hundred twenty to one hundred forty degrees Fahrenheit) for five to ten minutes.

As an alternate procedure for treating PTFE in roll form, a serpentine path is provided with powered rolls, a solution tank and an oven means through which the wet strip may be moved. The dip time is usually two to five seconds, as noted above, although a longer dip time is acceptable, followed by hot-air convection drying at one hundred twenty to one hundred forty degrees Fahrenheit. This temperature is for unsupported strips, but if supported temperatures as high as two hundred degrees F. may be used. An elevated temperature shortens the drying time to about fifteen to twenty seconds. After drying, the filter is ready for use as described.

The use of LAS in varioius concentrations and with various solutions was evaluated for establishing practical parameters of use. There are hereafter noted examples of test.

EXAMPLE I

A solution of one-eighth percent (0.125%) LAS in a solution of substantially equal volumes of isopropyl alcohol and water was prepared. Five milliliters of this solution was passed through twenty square centimeters of Accurel® polypropylene hollow fibers having a pore size of 0.1 to 0.2 microns. Assuming all the chemical remains within the hollow fibers, this equates to 6.25 mg of LAS per 20 cm (surface area) of hollow fiber. Physical weighing of the fibers showed a weight gain of 3.9 milligrams. This material was air dried for twenty-four hours at room temperature. Air was found to pass through the material, indicating that the membrane was totally dry. Distilled water at one meter head pressure was exposed to the hollow fiber material and was seen to exit on the downstream side in six seconds. Within fifteen seconds, the flow rate was twenty (20.0) milliliters per minute.

A control hydrophobic sample of polypropylene hollow fiber was "wet out" using a seventy percent isopropyl alcohol solution followed by a water rinse (250 milliliters). At equilibrium, the flow rate was observed under conditions of one meter head pressure and found to be nineteen and one-half (19.5) milliliters per minute.

EXAMPLE II

A solution of 6.2% LAS in a diluent of 70% isopropyl alcohol (7 parts IPA—3 parts H₂O by volume) was prepared. Five drops, using a 20 ga. hypodermic needle (105 drops to 1 milliliter), were deposited on a five square centimeter disk of Gore-Tex ® reinforced 0.2 micron Teflon ® membrane filter. After air drying the disk for twenty-four hours, the filter was "wet out," using 1, 1, 2 Trichlorotrifluoroethane and bubble-point tested. The filter was redried at room temperature for twenty-four hours and weighed. The weight gain was 2.7 milligrams. Upon introduction of water, the Gore-Tex ® reinforced 0.2 micron Teflon ® membrane "wet out" in five to ten seconds and exhibited a water flow rate of 2.9 milliliters per minute at one meter head pressure.

A control sample of Gore-Tex ® reinforced 0.2 micron Teflon ® which was "wet out," using Ethanol as the wetting agent, exhibited a flow rate of 2.6 milliliters per minute, using distilled water at a head pressure of one meter.

EXAMPLE III

A solution of 1.2% LAS in a solution of 70% isopropyl alcohol (7 parts IPA—3 parts water by volume) was prepared. Ten drops, using a 20 ga. hypodermic needle (105 drops equal one milliliter), were deposited on a five square centimeters disk (circle) of Poreflon ®FP-022 (PTFE polymer) 0.2 micron filter membrane. The disk was dried out by heating at 125° F. for two hours. The weight gain was 1.0 milligrams. Upon introduction of water, this Poreflon ®FP-022 membrane "wet out" immediately. The flow rate at one meter head pressure was 1.4 milliliters per minute. A "pre-wet out" control sample (same size) of Polyflon ®, using Ethanol as the wetting agent, under identical test conditions exhibited a water flow rate of 1.5 milliliters per minute.

In the examples cited above, Ultra-wet 60L ® was the LAS chemical used. Ultrawet 60L is a Triethanolamine Dodecylbenzene Sulfonate (an LAS chemical). This product is sold by ARCO Chemicals of Philadelphia, Pa.

It is of note that the above examples are directed to polypropylene (PP) and Polytetrafluorethylene (PTFE). These are the preferred material due to their recognized inertness and bio-compatibility properties.

LAS as a small portion of the solution is a preferred selected material since it is non-toxic; does not produce a gel, and "wets out" the membrane. As little as 0.125 (⅛%) percent LAS has been used, but the usual concentrations are at least 0.25 (¼%) percent. As above noted, the critical surface tension is thirty dynes per cm for polypropylene and polytetrafluoroethylene polymers. LAS, when mixed with a diluent of alcohol and water in such proportions that the surface tension of the mixture is less than the critical surface tension of the polymer membrane, allows for direct "wet out" of the membrane filter. The LAS impregnates the membrane filter at the same time the solution "wets out" the membrane filter.

The LAS can be prepared in an aqueous solution. In this instance, the membrane filter must first be "wet out" by passing a low surface tensin fluid such as Freon ® through the membrane filter. While still wet, the LAS aqueous solution is passed through the membrane filter, followed by drying. This two-step procedure will also satisfactorily impregnate the membrane filter with LAS.

In addition to isopropyl alcohol, other alcohols may be used with or without water to form the diluent. For example, ethanol or methanol may be used as the alcohol. The percentage of alcohol used may be as little as five percent and as much as one hundred percent (100%), less the small amount of LAS used, as long as the resulting solution's surface tension is less than the critical surface tension of the polymer membrane filter.

Although the percent concentration of the LAS is important, the amount of LAS deposited on the surface of the filter is what determines the ability of the filter to take on hydrophilic properties. Using low concentrations and passing the solution through the filter results in uniform deposits of LAS chemical throughout. This is especially so where membrane hollow fibers are used. Higher concentrations and dip-type processes are preferred where both surfaces can be coated readily, such as flat sheet. In this case, flow-through is not required and large quantities of product can be coated rapidly and uniformly. In these cases, solution concentrations of 2-10% would be used.

In either process, a membrane having a dry coated weight of 0.2 milligrams per cm2 of filter area is more than sufficient to achieve "total wet-out". Coating weights of less than 0.1 milligrams per square centimeter of filter area result in incomplete wet-out since some gas flow is detected after wetting out the filter and testing same for ability to retain gas at low pressures.

At "relatively" high depositions of LAS, significant foaming occurs. This is a limitation as to the quantity of LAS that may be deposited on the membrane surface. The upper limit imposed by this condition is approximately 1.5 milligrams per square centimeter of filter area.

LAS is used commercially as a surfactant, but insofar as is known, not for medical or other membrane filters. LAS is available as a concentrate. This concentrate contains 65% of LAS in an aqueous solution. In the examples cited, it is noted that the LAS concentrate is diluted using a suitable diluent.

When the LAS-impregnated membrane filter is dried under temperatures of 125°-200° Fahrenheit, for some unexplained reason subsequent fluid "wet-out" is instantaneous. That is, the tine for the membrane to begin passage of fluid was less than one second. There are many applications, such as intravenous fluids filtration, in which this property is very important. For this reason, a preferred method for preparing hydrophilic membranes using LAS is to include the step of drying at elevated temperatures (125°-200° Fahrenheit). Higher temperatures, although they may be used, tend to distort the membrane unless a backing or some other support system is used, such as a non-woven polyester.

Low depositions are desirable for filters. These processes with the indicated concentrations and amounts of coating solutions used result in very small quantities of solids (LAS) being deposited. Although LAS is listed by the Food and Drug Administration as being non-toxic, a very desirable feature of this system is the very low amounts required to achieve a hydrophilic surface.

Triethanolamine Dodecylbenzene Sulfonate, a Linear Alkylbenzene Sulfonate, is the preferred material since it is non-toxic; does not have a cloud point; is easily prepared, and as a surface coating can be dispensed to give a uniformly-coated membrane having hydrophilic properties throughout. The deposited coating quantities are small and can be washed off readily during pre-filtering priming operations if so desired.

Triton ® is a trademark and trade name for a surfactant by ROHM and HAAS, and when used on polypropylene hollow fiber filters may produce a gel. KLUCEL ® is a trademark of HERCULES, INC., and may produce a gel. PLURONIC ® is a trademark of BASF WYANDOTTE CORPORATION, and as above may produce an unwanted gel. POREFLON ® is a trademark of SUMITOMO ELECTRIC IND., LTD. for polytetrafluoroethylene membrane. GORE-TEX ® is a trademark of W. L. GORE, INC. for polytetrafluoroethylene membranes.

The above examples of use of LAS solutions have indicated abbreviations for simplification of identification of the membrane materials and the flow rate of the fluids through the membrane after treatment. The above examples have been described to show preferred examples of use, but it is to be understood that the invention is not limited thereto, and protection is sought to the extent the prior art allows.

What is claimed is:

1. A method of coating a hydrophilic filter membrane to render said membrane hydrophilic, said method including the steps of coating a polypropylene membrane whose pore size is not larger than two (2) microns with a Triethanolamine Dodecylbenzene Sulfonate (LAS) chemical solution so that said polypropylene membrane is rendered hydrophilic and medically acceptable.

2. A method of coating a polypropylene membrane, as in claim 1, in which the dry coated weight of the deposited LAS is greater than one-tenth (0.1) milligrams and less than one and one-half (1.5) milligrams per square centimeter.

3. A method of coating a polypropylene membrane, as in claim 2, in which the applied treating solution is accelerated in its drying on the filter membrane by heating and moving air over the coated membrane, with said air heated from a low of about one hundred twenty-five degrees Fahrenheit (125° F.) to a higher temperature which is short of distorting said filter membrane.

4. A method of coating a hydrophobic filter membrane to render said membrane hydrophilic, said method including the steps of coating a polytetrafluoroethylene membrane whose pore size is not larger than two (2) microns with a Triethanolamine Dodecylbenzene Sulfonate (LAS) chemical solution so that said polytetrafluoroethylene membrane is rendered hydrophilic and medically acceptable.

5. A method of coating a polytetrafluorethylene membrane, as in claim 4, in which the dry coated weight of the deposited LAS is greater than one-tenth (0.1) milligrams and less than one and one-half (1.5) milligrams per square centimeter.

6. A method of coating a polytetrafluoroethylene membrane, as in claim 5, in which the applied treating solution is accelerated in its drying on the filter membrane by heating and moving air over the coated membrane, with said air heated from a low of about one hundred twenty-five degrees Fahrenheit (125° F.) to a higher temperature which is short of distorting said filter membrane.

* * * * *